US008806518B2

(12) United States Patent
Anderson (10) Patent No.: US 8,806,518 B2
(45) Date of Patent: Aug. 12, 2014

(54) PERFORMANCE ANALYSIS FOR COMBINING REMOTE AUDIENCE RESPONSES

(75) Inventor: Glen J. Anderson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 13/534,943

(22) Filed: Jun. 27, 2012

(65) Prior Publication Data

US 2014/0007147 A1   Jan. 2, 2014

(51) Int. Cl.
*H04H 60/33* (2008.01)
*H04N 21/25* (2011.01)
*H04N 21/44* (2011.01)

(52) U.S. Cl.
USPC .................. 725/9; 725/24; 725/141; 715/719

(58) Field of Classification Search
None
See application file for complete search history.

(56) References Cited

U.S. PATENT DOCUMENTS

| 4,745,468 | A * | 5/1988 | Von Kohorn ................... 725/141 |
| 2004/0117814 | A1 | 6/2004 | Roye |
| 2004/0117815 | A1 | 6/2004 | Kondo et al. |
| 2005/0138560 | A1 * | 6/2005 | Lee et al. ....................... 715/719 |
| 2006/0068818 | A1 * | 3/2006 | Leitersdorf et al. ........... 455/466 |
| 2007/0101061 | A1 * | 5/2007 | Baskaran et al. .............. 711/118 |
| 2007/0150811 | A1 | 6/2007 | Mizuta |
| 2007/0214471 | A1 * | 9/2007 | Rosenberg ....................... 725/24 |
| 2009/0067349 | A1 * | 3/2009 | Glueckman et al. ........... 370/260 |
| 2010/0211439 | A1 * | 8/2010 | Marci et al. ..................... 705/10 |
| 2011/0202949 | A1 * | 8/2011 | Glitsch et al. ................... 725/14 |
| 2011/0270950 | A1 | 11/2011 | Davis et al. |
| 2012/0017242 | A1 * | 1/2012 | Newell ............................. 725/38 |
| 2012/0124606 | A1 * | 5/2012 | Tidwell et al. .................. 725/17 |

FOREIGN PATENT DOCUMENTS

JP    2009-038420    2/2009

OTHER PUBLICATIONS

PCT Search Report, PCT/US2013/043481, Intel Corporation, Date Mailed Sep. 25, 2013, 12 pages.

* cited by examiner

*Primary Examiner* — Scott Beliveau
*Assistant Examiner* — Cynthia Fogg
(74) *Attorney, Agent, or Firm* — Blakely, Sokoloff, Taylor & Zafman LLP (57) ABSTRACT

Performance analysis for combining remote audience responses is described. In one example, a performance is presented to a plurality of viewer devices through a remote network connection. An audience response received from each of the plurality of viewer devices through the remote network connection during the presentation of the performance. The received audience responses are combined into a single media stream and the combined media stream is sent to each of the plurality of viewer devices during the performance.

21 Claims, 7 Drawing Sheets

PERFORMANCE ANALYSIS FOR COMBINING REMOTE AUDIENCE RESPONSES

BACKGROUND

In a live performance, a performer appears before a live audience and can observe the audience during the performance. The live audience may make the performance more enjoyable for the performer, more exciting, and more interactive. The experience of the live audience is also improved because of the presence of other audience members and perhaps a possibility to interact with the performer. If, instead of a live audience, a performance is presented online to a remote audience, then the direct interaction between the performer and the audience is severed. If the audience is in disparate locations, then the direct interaction between audience members is also severed. The severed connection reduces the appeal of the performance for both the performer and the audience.

To address this issue avatar-like characters have been proposed to represent an audience member's gestures, facial movements, or voice. This type of feedback is then shown to the performer or to other audience members to simulate some of the appeal of a performance before a live audience.

Unfortunately, the reality of online connections and user equipment render such proposals difficult to implement. Not all users receive the performance at the same time, nor have the ability to respond at the same time or with the same speed. The instant response provided by the audience is lost and instead the participants are left with something that does not directly correspond with the timing of the performance. The excitement and spontaneity may be lost.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Video and audio analysis software may be used to capture an online audience's reaction to an online performance, average those reactions across audience members, and present the performers and audience with a representation of the audience reaction. The audience reaction may be presented in near real time, or it may be mapped visually with a recording of the performance. In the first case, performers receive nearly immediate feedback (e.g., audience laughs). In both cases, this feedback may also be used to allow the audience to have social cues and immersion by knowing how others are reacting. The immediate feedback may be used to take the place of a live studio audience for a television program. For an even more genuine experience, the immediate feedback may be used as a "laugh track" that is created from a representation of a real online audience reaction.

The performance and the audience response may be synchronized so that immediate feedback may be presented to both performers and audience members. The synchronization differs from e.g. marketing tools that track user responses during various content (e.g., commercials) and present these to content evaluators.

Latency between a performance event and receiving an audience response can render the experience less appealing. In a live performance, performers and the audience can perceive a live person's reaction instantaneously. An online audience reaction will be delayed by the time for data to go through a remote online connection to an audience member, the time to process an audience member's gestures, facial movements, and voice at a local device, the time to return the response to the performer and other audience members, and the time to render the received data as an audience response. Additional time may be required for a computing system to gather and average the audience response.

To reduce the impact of this latency, audience responses may be gathered for a recorded performance. While the other audience members may receive a delayed response, the performance will not be affected. Alternatively, the audience reaction may be generalized. For example, the audience response may indicate that people are feeling good about the show in general instead of indicating how fast and how loud the laughs are to the last joke. In addition, the audience response may be limited, e.g., to vocal responses or smiles, to allow the response to be processed more quickly.

In order to further reduce latency, the connection speed of audience members may be tested. The portion of the audience with the fastest connections may be used for the "live" audience while those with slower connections are used for more general feedback. This allows immediate feedback to be presented without waiting for the weakest links. Even with latency, the ability to see other people's responses within 1-2 seconds is still compelling.

Audience reactions may be presented in a variety of different ways both to the performer and to the other audience members. The audience reaction may be a combined audio stream of "raw" audience audio or video (depending on the available bandwidth) combined into a single stream. In order to reduce bandwidth demands, the reaction of a portion of the audience may be used. The audience reactions may be sampled or some subset of the audience members may be used.

For a video presentation, individual audience members or their avatars may be presented to the performer and to the other audience members. These visual representations may also be either for a subset of a large audience or all of a smaller one. The avatars allow a representation of an audience members response to be seen without revealing the appearance or identity of the actual audience member.

Rather than a sample or a subset of the audience, an averaged audience response may be graphically presented using a media file. For example, a video could be synchronized to some metric of audience response. A user could then observe the audience response metric while watching the video or could scroll or zoom the video to find those parts with the biggest audience response track metric. This would allow people to skip to the part of a video that had the biggest reaction.

For a small audience of one person or a few friends, individual response tracks might be shared. A response track could saved and then emailed to a friend or posted on a shared server and played when the friend watches the corresponding content. Alternatively audience members could "manually" enter responses, as a media file is being watched. These responses could then be associated with time or frame numbers of the video and saved to later be shared with others.

Figure 1:
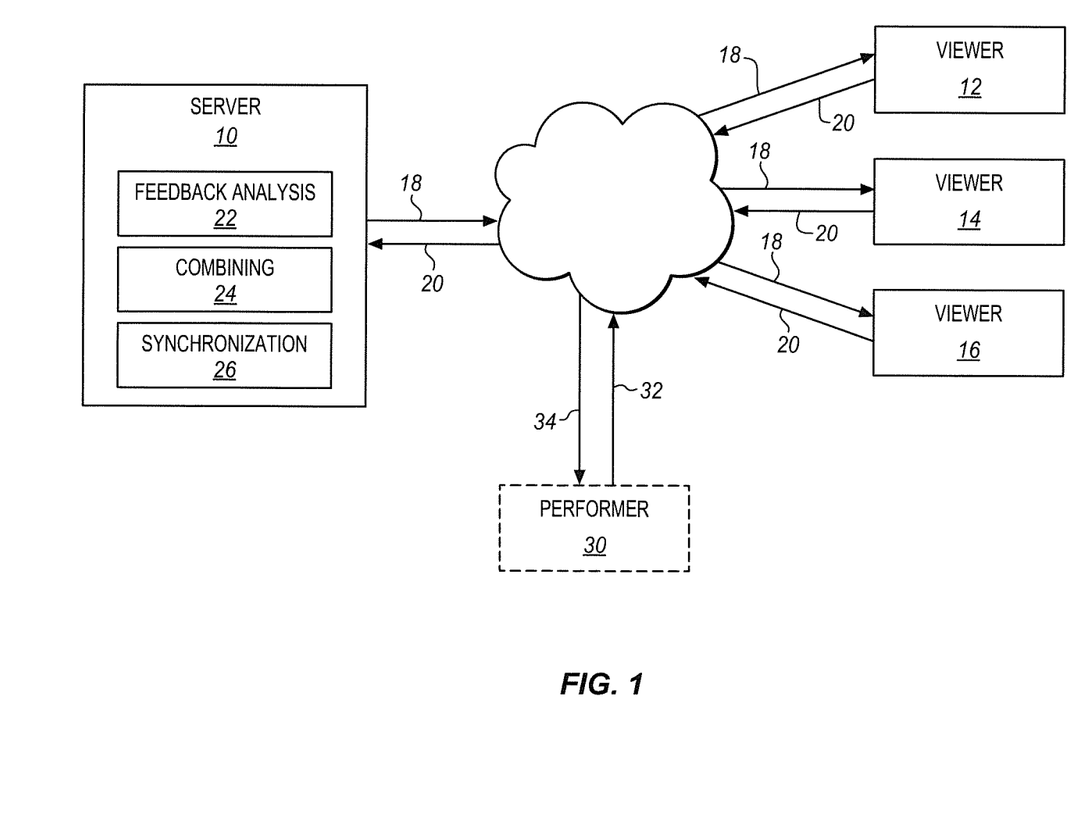
FIG. 1 is a diagram of a network environment to which embodiments of the invention may be applied.

FIG. 1 is a diagram of a network environment to which embodiments of the invention may be applied. In the example of FIG. 1, pre recorded performances are provided to multiple viewers and, as an option, live performances may also be provided to multiple viewers. A server 10 is coupled through the cloud to one or more viewer devices 12, 14, 16. While only three viewer devices are shown, there may be tens or hundreds or thousands of simultaneous viewer devices coupled to the server at any one time. The server provides an output 18 performance through the cloud to each of the viewer devices. The viewer devices, in turn, provide responses or feedback 20 through the cloud back to the server.

The audience responses 20 may take any of a variety of different forms as described in more detail below. The feedback may be actual audio or video or both of particular users of the devices. Alternatively, each viewer device may simplify or convert the user feedback to some other form that is more suitable for communication through the cloud. At the server 10, the received feedback is analyzed in a feedback analysis module 22. It is then combined in a combining module 24. The combined feedback is then synchronized with the provided performance 26. In this way, for a pre recorded performance, the server can provide the performance together with a synchronized user feedback or audience response stream. These two streams may be sent to each of the viewers synchronized and simultaneously.

For a live performance, an optional separate performer device 30 may be used. The performer device sends the performance 32 through to the server, the server then rebroadcasts the performance to all of the viewer devices 12, 14, 16. The viewer devices provide feedback in the same way as with a preecorded session. However, when the server provides audience feedback, back to each of the viewers, it may also send the audience feedback to the performer 34.

Figure 2A:
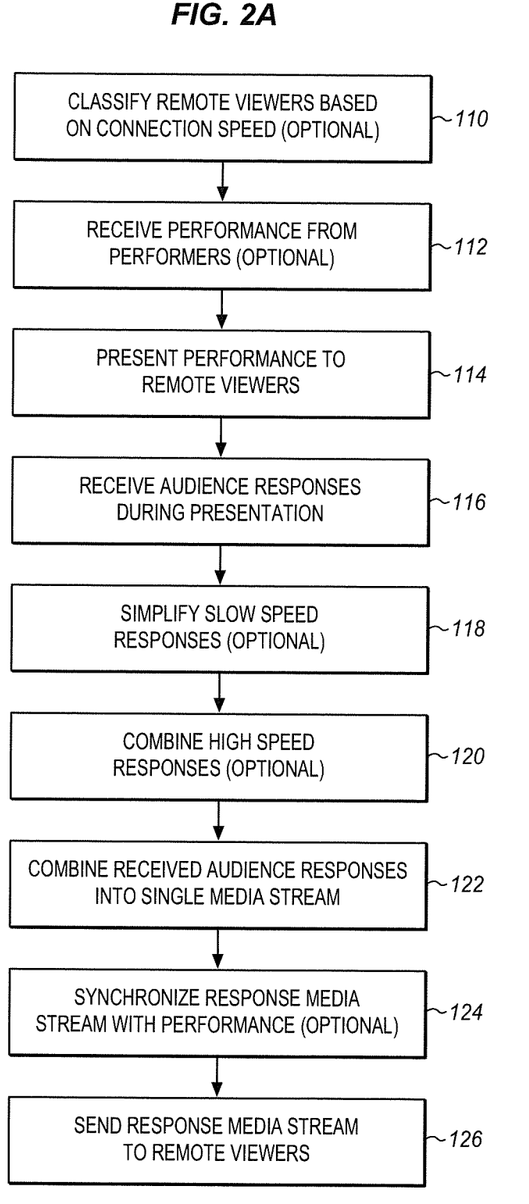
FIG. 2A is a process flow diagram of providing audience feedback with a performance from a server according to an embodiment of the invention.
Figure 2B:
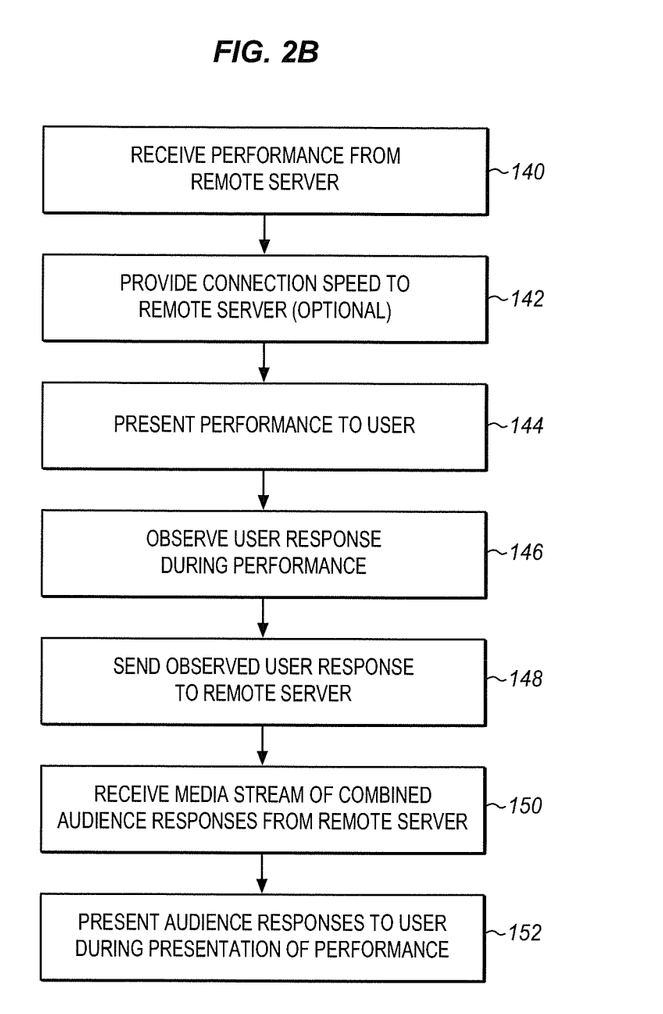
FIG. 2B is a process flow diagram of receiving audience feedback from a remote server with a performance at a viewer device according to an embodiment of the invention.

Operation of the network system FIG. 1 may be better understood in the context of the processes of FIGS. 2A and 2B. FIG. 2A is a process flow diagram of providing audience feedback with a performance from the server. In FIG. 2A at 110 the server may optionally classify all of the viewer devices based on the connection speed of each device. Classifying the viewer devices allows viewers with different speeds to be handled differently. For viewer devices with particularly fast connections, their feedback may be provided directly and immediately to other viewer devices. With a sufficiently fast connection, the presentation of the performance is almost simultaneous with the presentation of the audience response. This allows a performance to be presented in a way that resembles, in some respects, a live performance before a live audience.

For slower viewer devices, the delay between the viewer seeing the performance and then the response to that performance being provided to the server may be so great as to be disruptive to other audience members if that feedback were to be provided immediately back to the other audience members. Accordingly, slower viewer devices may be instructed to send something other than an actual audio or video representation of the viewer's response. First, the viewer feedback may be sent through a slower connection more quickly if it is simplified into, for example, a simple numerical score in one or more categories.

Alternatively, the viewer feedback may be sent back in total to the remote server. The remote server can then simplify or abstract the received feedback into a generally positive, generally laughing, generally negative, or some other type of abstracted or generalized feedback to be presented to the other audience members or to the performers. This allows the viewer feedback to be added to the overall audience response without distracting delays being presented to the other viewers.

At 112 the remote system receives a performance from a performer. This operation is optional and instead the server may use a pre recorded performance. At 114 the performance is presented to the remote viewers. At 116 the server receives audience responses from the remote viewers during the presentation of the performance. In the example of FIG. 1 the performance is received through a network connection. It is presented to viewer devices through a network connection and audience responses are also received through a network connection. Alternatively the remote server may be located with or in the same location as the performers and may be used as the performer device as well as a server to remote users. Alternatively, the remote server may be collocated with one or more viewer devices and may be the same or an additional computing device.

At 118 the audience response may be processed in a variety of different ways as mentioned above. Particularly for responses from viewer devices that have a slower speed connection, the audience response may be simplified or abstracted to a general level on a particular scale. There may be different scales for different types of responses. For example, one scale may indicate a general positive or negative feeling. Another scale may be for an amount of laughing. Another scale may be for an amount of fear, anxiety, or suspense. Audience responses may also be normalized or converted into an automated response or the response may be measured and then applied to a look up table or some other device that allows a preconfigured response to be accessed instead of the actual true response of a particular audience member.

At block 120 the high speed responses are combined into a single stream. This allows the actual laugh, cry, shout or other utterance as well as any visual signals to be sent to the audience and to the performers as a single signal. At block 122 all of the audience responses in their final form are combined into a single media stream. At block 124 the media stream of audience responses may be synchronized with the performance and at block 126 the media stream of audience response is sent to the remote viewers and if available also to the performers.

FIG. 2B is a process flow diagram of receiving audience feedback from a remote server with a performance at a viewer device. At 140 the performance is received from the remote server. As mentioned above this may be a live performance or a prerecorded performance.

At 142 the viewer device may perform some operations to provide a connection speed to the remote server. This may be done through pings, through network speed tests, through user response instructions presented on a display, or in an any of a variety of other ways. At block 144 the viewer device presents the received performance to the user. At 146 the device observes the user's response during the performance and at 148 sends the user's response to the remote server. The viewer device may send the actual observed user response to the remote server or it may simplify, compress or abstract this response in any of a variety of different ways.

At 150 the viewer device receives a media stream of combined audience responses from the remote server and at 152 presents these audience responses to the user during the presentation of the performance. If the media stream is received quickly after the performance is rendered then the audience response and performance will seem to be closely synchronized.

The operations of FIG. 2A and FIG. 2B may be used in one example to provide a semblance of a live performance to a live audience to multiple viewers in different remote locations. The semblance of a live audience may also be provided to performers during their performance. Alternatively, a recorded performance may be provided to remotely located viewers simultaneously as if it were a live performance. The audience response from all of the remote viewers collectively can be combined and then provided immediately back to those same viewers. This again for the audience provides a semblance of a performance before a live audience. However, the performers are not directly involved in this rendition of the performance.

As a further alternative the performance may be provided with previously received audience responses. The viewer will have an experience similar to that of a live audience except that the live audience is a prerecorded audience to a previous rendering of the performance. All of the mechanisms to collect audience responses during the current recorded performance may still be used. However, instead of providing the new audience responses back to the viewers immediately, the audience responses may be recorded for use with a later rendering of the recorded performance. In this way the audience response for multiple presentations of the recorded performance may be accumulated together to provide an increasingly more lively and accurate audience response to each successive performance.

The audience may also be partitioned by some attribute, such as geographic location, estimated age range, gender, etc. These attributes can be estimated by well known methods such as global positioning satellites, video analysis of a camera feed of the user's face, MAC addresses, service provider identification, user profile info, etc. The benefit of partitioning the audience is that a member of the audience may choose to receive responses from a group of audience members with which he has something in common.

By recording the audience responses and not presenting them to users during the performance any delays in the network connections will not affect the perceived spontaneity of the audience response that is provided to the viewers. Alternatively, the audience response received during the current performance may be combined with audience responses received during previous performances and the accumulated total audience response may be presented to the viewers during the performance. By presenting and collecting audience feedback during a performance, the perception of a live performance may be greatly enhanced.

Figure 3:
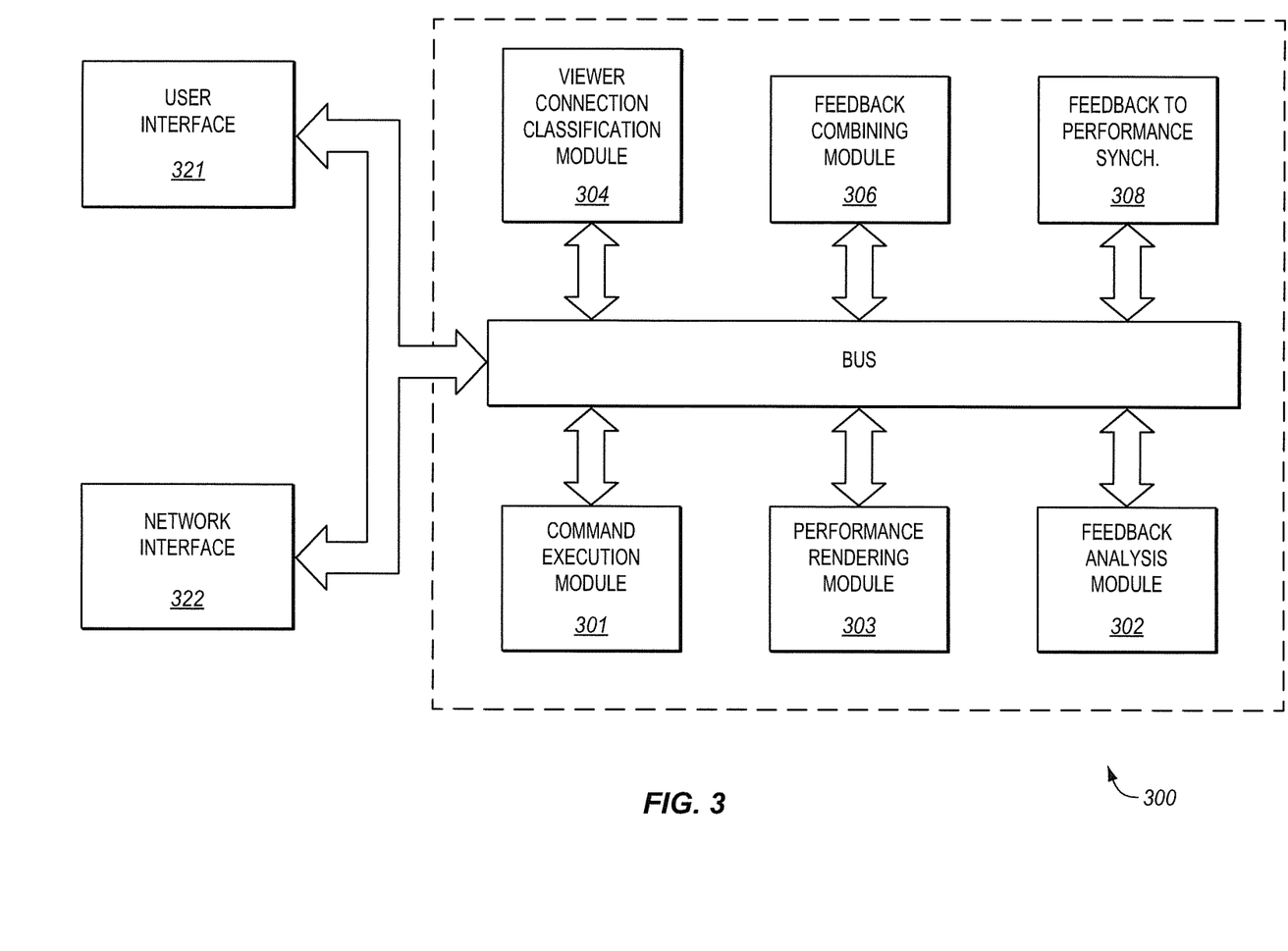
FIG. 3 is a block diagram of a server system capable of supporting the operations of FIGS. 2A and 2B according to an embodiment of the invention.

FIG. 3 is a block diagram of a server system 300 capable of supporting the operations discussed above. The modules and systems can be implemented in a variety of different hardware architectures and form factors including that shown in FIG. 6. Internal components 301, 302, 303, 304, 306, 308 are coupled together using a bus and external components 321, 322 are coupled directly or indirectly to the same bus.

The Command Execution Module 301 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The User Interface Module 321 receives user commands and configuration instructions and allows parameters of the system to be adjusted to suit different application and configurations. Typically a mouse and keyboard are used, however, the system is not so limited.

The Network Interface System 322 sends and receives multiple data packets and streams from multiple remote devices. These may include a performer device and viewer device as well as remote system administration. Any of a variety of different wired and wireless interface systems may be used depending on the particular application.

The Viewer Connection Classification Module 304 is adapted to receive data from viewer devices through the network interface system and classify each viewer device based on its connection. Faster connections are classified differently from slower connections. Faster connections are those which allow the server to receive feedback shortly after a prompt is sent. The speed may be affected by the path to and from the viewer device as well as the operational speed of the viewer device. There may be several different classifications that are each handled differently. The classifications may be made using pings or another round trip measurement. Alternatively, instructions may executed by the viewer device that allow a connection speed to be measured.

The Feedback Combination Module 306 average the user responses or may perform any other feedback combination process. The combined feedback is sent as audio, video, or metadata back to the end user devices. The end user devices represent the received data as an audience response. The end user devices may be those of the performer as well as audience members.

The Feedback to Performance Synchronization Module 308, receives the combined feedback from the feedback combination module and synchronizes presentation of the performance with the audience reaction before the performance and reactions are presented back to the performers and audience. It may combine the feedback with a recorded version of the performance or it may place markers in the feedback that reference to timing, frame numbers or some other reference in the recorded performance.

The Performance Rendering Module 303 retrieves a performance whether live or prerecorded and provides it to viewer devices through the network interface system. The live performance may be obtained through locally connected cameras and microphones or it may be received through the network from a remote location. Similarly, a prerecorded performance may be obtained from local storage or from remote storage. The performance rendering module receives the performance and renders it into a format that can be presented by the viewer devices. This module may also add security, encryption, or other features to the performance before it is transmitted, depending on the implementation.

The Feedback Analysis Module 302 receives audience feedback information from the remote viewer devices and interprets the received data. If the feedback is in the form of audio or video, then the feedback analysis module may interpret the sound and images as positive or negative, as laughing or crying, or as any other type of response by evaluating the audio or video or both. If the feedback is in the form of a numerical value on one or more scales, then the module can normalize, classify or group the numerical data to generate raw or cumulative data on each of the scales. This module provides the analyzed feedback to the feedback combining module so that all of the feedback can be combined before it is sent to viewers and performers.

Figure 4:
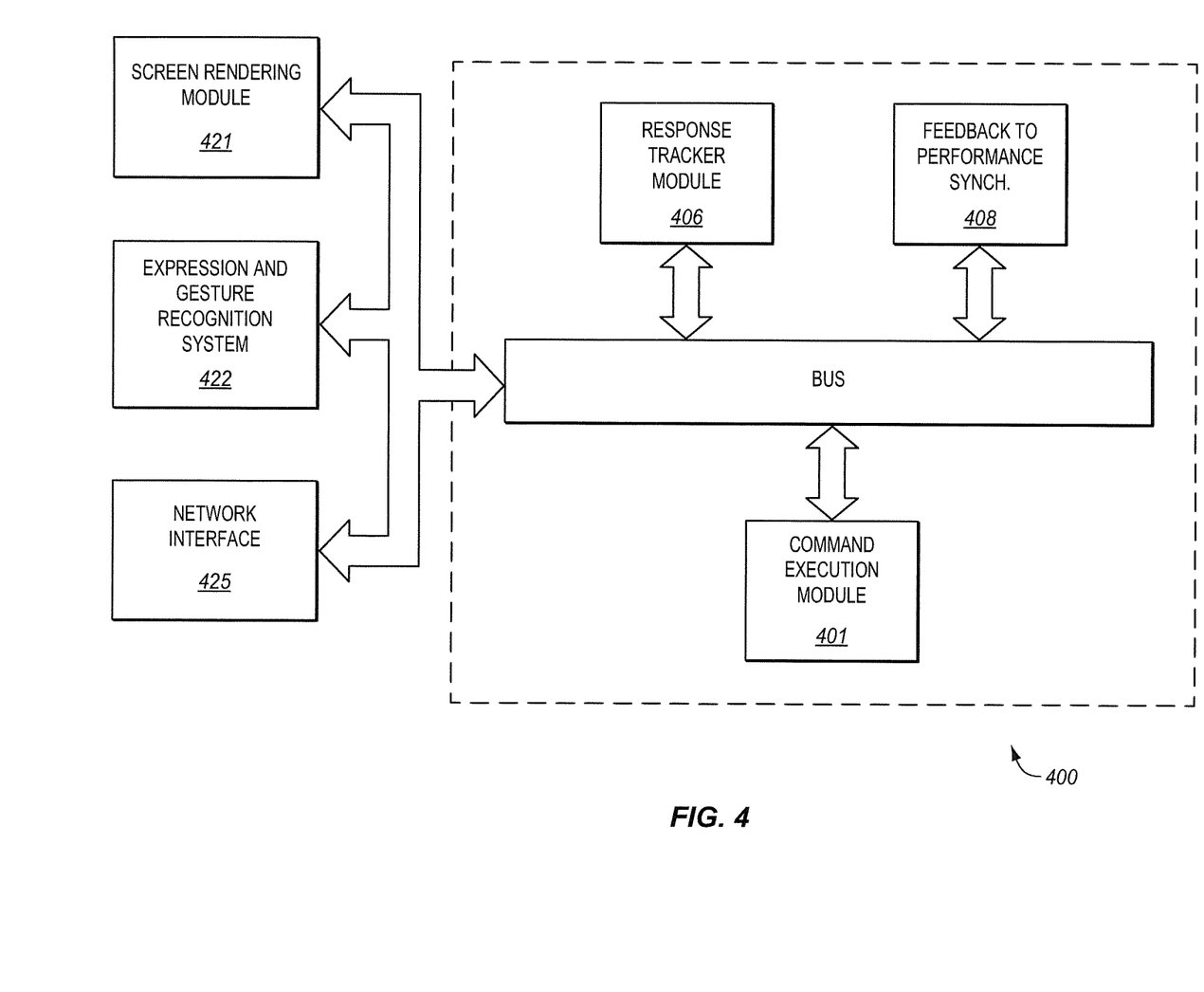
FIG. 4 is a block diagram of a viewer device system capable of supporting the operations of FIGS. 2A and 2B according to an embodiment of the invention.

FIG. 4 is a block diagram of a viewer device system 400 capable of supporting the operations discussed above. The modules and systems can be implemented in a variety of different hardware architectures and form factors including that shown in FIG. 6. The external components 421, 422, 425 are coupled to the bus directly or indirectly, through which the internal components are connected.

The Command Execution Module 401 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 421 renders the received performance on one or more display screens for the user to see. It can be adapted to receive the data from the feedback to performance synchronization module 408, described below, and to render the performance and feedback together. It can also be provided to decrypt, unpack, transcode or perform any other functions necessary to present the performance and feedback. The screen rendering module may also render audio as well as video.

The Expression and Gesture Recognition System 422 may be adapted to recognize and track hand, face and body expressions and gestures of a user. This module observes the user to determine how the user reacts to the performance. Changes in expression, spoken words, as well as nonverbal communications such as laughing, crying, or other emotional outcries may be observed and recorded by this module and then provided to the response tracker module provided below. The user may also provide feedback using a conventional input device such as mouse, keyboard, or touchpad. This module may recognize more than one user at a time when the audience for the viewer device has more than one person. This may be done using one or more observation systems. The Expression and Gesture Recognition System may be coupled to a camera or camera array, a microphone or microphone array, a touch screen or touch surface, or a pointing device, or some combination of these items, to detect expression, gestures and commands from the user.

The Network Interface Module 425 receives a performance from a remote server and provides feedback back to the remote server. It may also receive commands, security codes, and other data and instructions from the remote server to allow the viewer device to operate in the described system. Otherwise the Network Interface Module 425 also performs the functions described above in the context of FIG. 3.

The Response Tracker Module 406 runs on the local viewer device to track an individual user's response or the response of all of the individuals in a room, using video and audio analysis of the user's image. This module receives expression and gesture data from the expression and gesture recognition module and tracks any changes in the observed feedback from the user. The desired format for summarizing the user reaction (e.g., whether a smile or laugh was detected at a given time) may be forwarded to the remote server for accumulation, analysis, and averaging. Rules for what is desired for user response detection may be downloaded to the viewer device and applied by the response tracker module. Other sensors, such as those to measure galvanic skin response or heart rate, could be used to help interpret user reactions.

A change of expression or a start or end of a gesture may be interpreted as an event to be communicated back to the remote server. In one embodiment, each viewer device only sends feedback when there is a change in expression or gesture. In this way, network traffic is not used by continuing to send information about a quiet and expressionless viewer. If the viewer makes changes expressions or makes an utterance, whether verbal or nonverbal, then this or a representation of it is transmitted to the remote server. In another embodiment, the user's behavior is constantly transmitted to the remote server during the performance.

The Feedback to Performance Synchronization Module 408, receives the combined feedback from the feedback combination module and synchronizes presentation of the performance with the audience reaction so that the performance and the reactions may be presented together. This is particularly useful for a recorded performance which does not already include audience feedback. The synchronization may be made by reference to timing, frame numbers or some other reference in the recorded performance.

Figure 5:
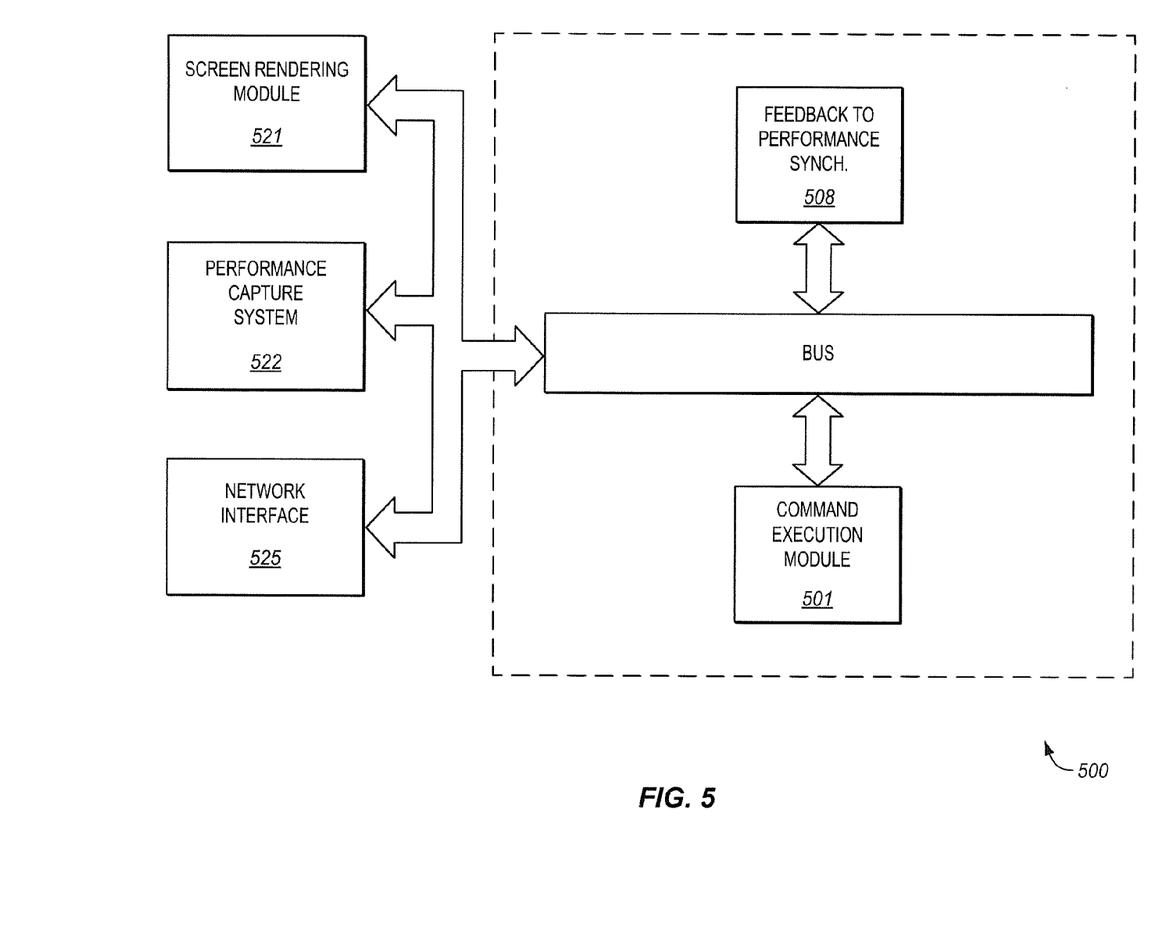
FIG. 5 is a block diagram of a performer system capable of supporting the operations of FIGS. 2A and 2B according to an embodiment of the invention.

FIG. 5 is a block diagram of a performer system 500 capable of supporting the operations discussed above. The modules and systems can be implemented in a variety of different hardware architectures and form factors including that shown in FIG. 6.

The Command Execution Module 501 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 521 renders the received audience feedback on one or more display screens for the user to see. The screen rendering module may render audio and video of actual audience responses or it may render other representations of the responses. These representations may be graphical, audible, or numerical.

The Performance Capture System 522 captures the performance as it is being made and sends it to the remote server or to a recording device. It may also encode, compress, or encrypt the captured performance or perform any other desired operations on the capture before it is sent or stored. This system may be coupled to a camera or camera array, a microphone or microphone array, or any other desired capture devices.

The Network Interface Module 525 sends the performance to the remote server and receives feedback from the remote server. It may also receive commands, security codes, and other data and instructions from the remote server to allow the viewer device to operate in the described system.

The Feedback to Performance Synchronization Module 508, receives the combined feedback from network interface module 525 and synchronizes presentation of the audience response with the performance.

Figure 6:
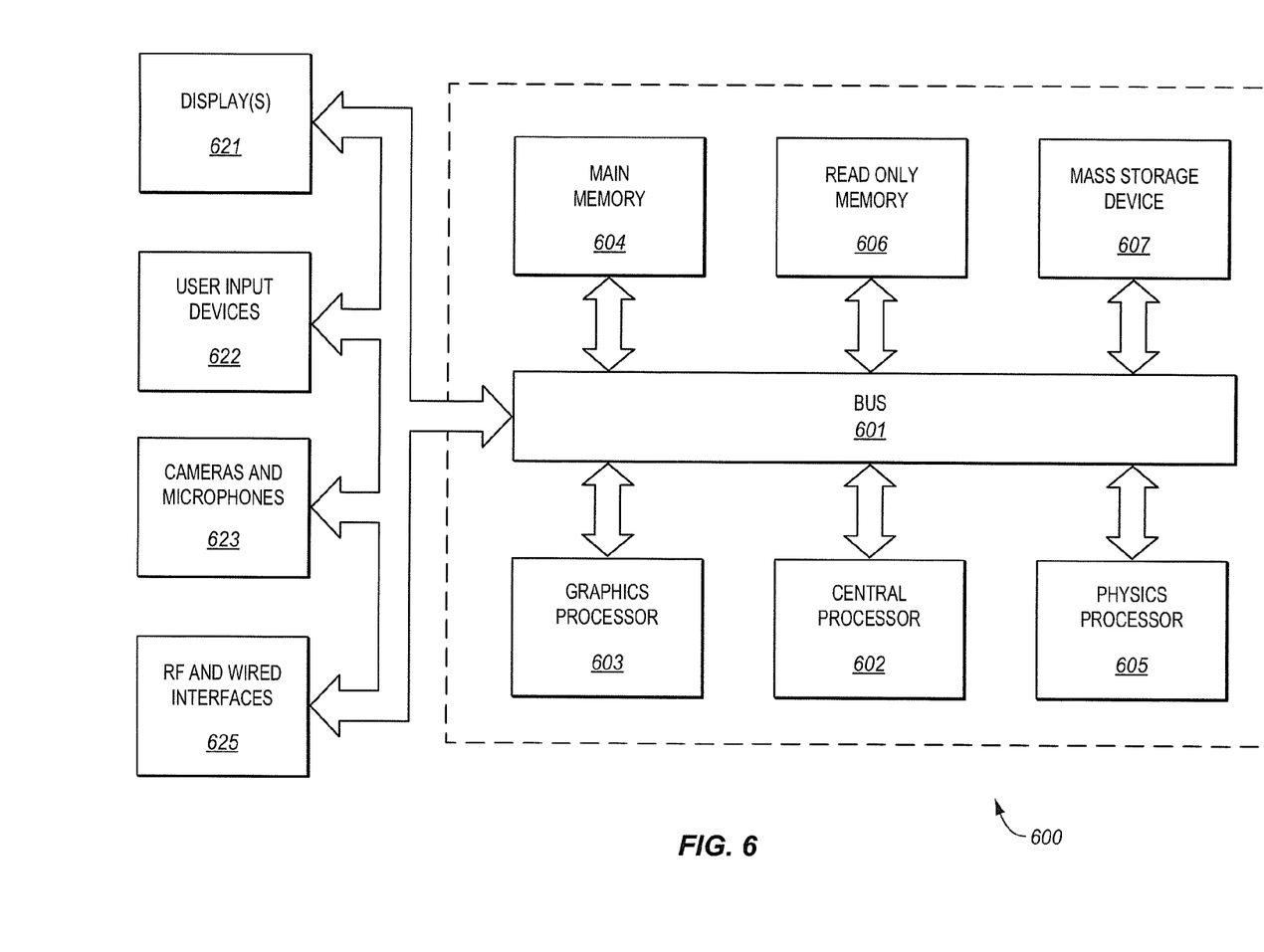
FIG. 6 is block diagram of a computer system suitable for implementing processes of the present disclosure according to an embodiment of the invention.

FIG. 6 is a block diagram of a computing system, such as a personal computer, gaming console, smartphone or portable gaming device. The computer system 600 includes a bus or other communication means 601 for communicating information, and a processing means such as a microprocessor 602 coupled with the bus 601 for processing information. The computer system may be augmented with a graphics processor 603 specifically for rendering graphics through parallel pipelines and a physics processor 605 for calculating physics interactions as described above. These processors may be incorporated into the central processor 602 or provided as one or more separate processors.

The computer system 600 further includes a main memory 604, such as a random access memory (RAM) or other dynamic data storage device, coupled to the bus 601 for storing information and instructions to be executed by the processor 602. The main memory also may be used for storing temporary variables or other intermediate information during execution of instructions by the processor. The computer system may also include a nonvolatile memory 606, such as a read only memory (ROM) or other static data storage device coupled to the bus for storing static information and instructions for the processor.

A mass memory 607 such as a magnetic disk, optical disc, or solid state array and its corresponding drive may also be coupled to the bus of the computer system for storing information and instructions. The computer system can also be coupled via the bus to a display device or monitor 621, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 621.

Camera and microphone arrays 623 are coupled to the bus to observe gestures, record audio and video and to receive visual and audio commands as mentioned above.

Communications interfaces 625 are also coupled to the bus 601. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, or control surfaces or consoles, or servers via a conventional network infrastructure, including an Intranet or the Internet, for example.

It is to be appreciated that a lesser or more equipped system than the example described above may be preferred for certain implementations. Therefore, the configuration of the exemplary systems 600 will vary from implementation to implementation depending upon numerous factors, such as price constraints, performance requirements, technological improvements, or other circumstances.

Examples of the electronic device or computer system may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following examples pertain to further embodiments. Specifics in the examples may be used anywhere in one or more embodiments. In one embodiment, a method comprises presenting a performance to a plurality of viewer devices through a remote network connection, receiving an audience response from each of the plurality of viewer devices through the remote network connection during the presentation of the performance, combining the received audience responses to a single media stream, and sending the combined media stream to each of the plurality of viewer devices during the performance.

Further embodiments include the above method wherein presenting a performance comprises presenting a live performance by at least one performer during the performance, the method further comprising sending the combined media stream to the at least one performer during the performance.

Further embodiments include the above methods wherein receiving an audience response comprises receiving audio of a user of a respective viewer device.

Further embodiments include the above methods also including classifying each of the plurality of viewer devices as either fast or slow, and wherein combining the received audience responses comprises handling fast viewer device audience responses differently from slow viewer device audience responses.

Further embodiments include the above methods also including converting audience responses from slow viewer devices to a graphical representation of each respective audience response before combining the received audience responses.

Further embodiments include the above methods wherein receiving fast viewer device audience responses comprises receiving audio of users of viewer devices and wherein combining the received audio responses comprises combining the received user audio with the converted graphical representations to a single media stream.

Further embodiments include the above methods wherein classifying the viewer devices comprises classifying the viewer devices based on the duration between a presentation of a cue to each viewer and the receipt of a reply.

Further embodiments include the above methods wherein combining further comprises filtering the received audience responses.

Further embodiments include the above methods wherein filtering the received audience responses comprises removing the received audience responses that do not exceed a threshold.

Further embodiments include the above methods wherein the threshold is at least one of a threshold volume amplitude, a threshold facial expression change, or a threshold response strength indication.

Further embodiments include the above methods wherein combining comprises averaging the received audience response.

Further embodiments include the above methods also including associating the combined media stream to timing of the presented performance.

Further embodiments include the above methods wherein the presented performance is prerecorded and wherein associating comprises synchronizing the combined media stream to the recording of the performance.

Further embodiments include the above methods also including presenting the performance after combing the received audience responses to a plurality of viewer devices in combination with the combined media stream.

In another embodiment, a method comprises receiving a presentation of a performance at a viewer device from a remote server through a network connection, presenting the presentation of the performance to a user of the viewer device, observing a user response at the viewer device during the presentation of the performance, sending a representation of the observed user response to the remote server during the performance, receiving a media stream of combined audience responses sent by other viewer devices to the remote server during the performance, and presenting the media stream in combination with the presentation of the performance to the user of the viewer device.

Further embodiments include the above methods wherein receiving a presentation comprises receiving a presentation of a performance as the performance is being made by at least one performer.

Further embodiments include the above methods wherein observing a user response comprises observing the user with a camera, the method further comprising converting the observation by the camera into a numerical representation of the observed response, the numerical representation indicating an amount and a type of a response of the user.

Further embodiments include the above methods also including receiving rules from the remote server for converting an observed user response into a representation of the observed user response; and applying the rules to convert an observed user response into a representation of the observed user response before sending the representation.

In another embodiment an apparatus comprises a network output interface to transmit a performance to a plurality of viewer devices through a remote network connection, a network input interface to receive an audience response from each of the plurality of viewer devices through the remote network connection during the presentation of the performance, and a combining module to combine the received audience responses to a single media stream, wherein the network output interface sends the combined media stream to each of the plurality of viewer devices during the performance.

Further embodiments include the above apparatus also including a synchronization module to associate the combined media stream to timing of the performance.

In another embodiment, an apparatus comprises a network input interface to receive a presentation of a performance at a viewer device from a remote server through a network connection, a display to present the presentation of the performance to a user of the viewer device, a camera to observe a user response at the viewer device during the presentation of the performance, and a network output interface to send a representation of the observed user response to the remote server during the performance, the network input interface to further receive a media stream of combined audience responses sent by other viewer devices to the remote server during the performance, the display to present the media stream in combination with the presentation of the performance to the user of the viewer device.

Further embodiments include the above apparatus also including a processor to convert the observed user response to a representation of the observed user response before sending the representation of the observed user response to the remote server.

In another embodiment, a non-transitory machine-readable medium has instructions that when operated on by the machine cause the machine to perform operations that include presenting a performance to a plurality of viewer devices through a remote network connection, receiving an audience response from each of the plurality of viewer devices through the remote network connection during the presentation of the performance, combining the received audience responses to a single media stream and sending the combined media stream to each of the plurality of viewer devices during the performance.

Further embodiments include classifying each of the plurality of viewer devices as either fast or slow, and handling fast viewer device audience responses differently from slow viewer device audience responses. The operations may also include converting audience responses from slow viewer devices to a graphical representation of each respective audience response before combining the received audience responses.

In another embodiment, a non-transitory machine-readable medium has instructions that when operated on by the machine cause the machine to perform operations that include receiving a presentation of a performance at a viewer device from a remote server through a network connection, presenting the presentation of the performance to a user of the viewer device, observing a user response at the viewer device during the presentation of the performance, sending a representation of the observed user response to the remote server during the performance, receiving a media stream of combined audience responses sent by other viewer devices to the remote server during the performance, and presenting the media stream in combination with the presentation of the performance to the user of the viewer device.

Further embodiments include the above operations also including determining whether the viewer device has a slow connection to the remote server and if the viewer device has a slow connection, then converting the observation by the camera into a numerical representation of the observed response, the numerical representation indicating an amount and a type of a response of the user.

Further embodiments include the above operations also including synchronizing the received media stream with the presentation of the performance.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples.

Numerous variations, whether explicitly given in the specification or not, such as differences in structure, dimension, and use of material, are possible. The scope of embodiments is at least as broad as given by the following claims.

What is claimed is:

1. A method comprising:
presenting a performance to a plurality of viewer devices through a remote network connection;
receiving an audience response from each of the plurality of viewer devices through the remote network connection during the presentation of the performance;
classifying each of the plurality of viewer devices as either having a fast connection or a slow connection;
combining audience responses from viewer devices classified as having fast connections into a single stream;
abstracting audience responses from viewer devices classified as having slow connections into generalized responses;
combining the combined fast connection and abstracted slow connection audience responses to a single media stream; and
sending the combined media stream to each of the plurality of viewer devices during the performance.

2. The method of claim 1, wherein presenting a performance comprises presenting a live performance by at least one performer during the performance, the method further comprising sending the combined media stream to the at least one performer during the performance.

3. The method of claim 1, wherein receiving an audience response comprises receiving audio of a user of a respective viewer device.

4. The method of claim 1, further comprising converting audience responses from slow viewer devices to a graphical representation of each respective audience response before combining the received audience responses.

5. The method of claim 4, wherein receiving fast viewer device audience responses comprises receiving audio of users of viewer devices and wherein combining the received audio responses comprises combining the received user audio with the converted graphical representations to a single media stream.

6. The method of claim 1, wherein classifying the viewer devices comprises classifying the viewer devices based on the duration between a presentation of a cue to each viewer and the receipt of a reply.

7. The method of claim 1, wherein combining further comprises filtering the received audience responses.

8. The method of claim 7, wherein filtering the received audience responses comprises removing the received audience responses that do not exceed a threshold.

9. The method of claim 8, wherein the threshold is at least one of a threshold volume amplitude, a threshold facial expression change, or a threshold response strength indication.

10. The method of claim 7, wherein combining comprises averaging the received audience response.

11. The method of claim 1, further comprising associating the combined media stream to timing of the presented performance.

12. The method of claim 11, wherein the presented performance is prerecorded and wherein associating comprises synchronizing the combined media stream to the recording of the performance.

13. The method of claim 11, further comprising presenting the performance after combining the received audience responses to a plurality of viewer devices in combination with the combined media stream.

14. A method comprising:
receiving a presentation of a performance at a viewer device from a remote server through a network connection;
presenting the presentation of the performance to a user of the viewer device;
observing a user response at the viewer device during the presentation of the performance;
sending a representation of the observed user response to the remote server during the performance;
receiving classification of each of a plurality of viewer devices as either having a fast connection or a slow connection;
receiving a media stream of combined audience responses sent by other viewer devices to the remote server during the performance, the media stream being a combination of audience responses from users of viewer devices classified as having a fast connection and a generalized response abstracted from audience responses of viewer devices classified as having a slow connection; and
presenting the media stream in combination with the presentation of the performance to the user of the viewer device.

15. The method of claim 14, wherein receiving a presentation comprises receiving a presentation of a performance as the performance is being made by at least one performer.

16. The method of claim 14, wherein observing a user response comprises observing the user with a camera, the method further comprising converting the observation by the camera into a numerical representation of the observed response, the numerical representation indicating an amount and a type of a response of the user.

17. The method of claim 14, further comprising receiving rules from the remote server for converting an observed user response into a representation of the observed user response; and applying the rules to convert an observed user response into a representation of the observed user response before sending the representation.

18. An apparatus comprising:
a network output interface to transmit a performance to a plurality of viewer devices through a remote network connection;
a network input interface to receive an audience response from each of the plurality of viewer devices through the remote network connection during the presentation of the performance;
a classification module to classify each of the plurality of viewer devices as either having a fast connection or a slow connection;
and a combining module to combine audience responses received from viewer devices classified as having a fast connection into a single stream, to abstract audience responses received from viewer devices classified as having a slow connection into generalized responses, to combine the combined fast connection and abstracted slow connection audience responses to a single media stream, wherein the network output interface sends the combined media stream to each of the plurality of viewer devices during the performance.

19. The apparatus of claim 18, further comprising a synchronization module to associate the combined media stream to timing of the performance.

20. An apparatus comprising:
a network input interface to receive a presentation of a performance at a viewer device from a remote server through a network connection;
a display to present the presentation of the performance to a user of the viewer device;
a camera to observe a user response at the viewer device during the presentation of the performance; and
a network output interface to send a representation of the observed user response to the remote server during the performance the network input interface to receive classification of each of a plurality of viewer devices as either having a fast connection or a slow connection the network input interface to further receive a media stream of combined audience responses sent by other viewer devices to the remote server during the performance, the media stream being a combination of audience responses from users of viewer devices classified as having fast connections and a generalized response abstracted from audience responses of viewer devices classified as having slow connections, the display to present the media stream in combination with the presentation of the performance to the user of the viewer device.

21. The apparatus of claim 20 further comprising a processor to convert the observed user response to a representation of the observed user response before sending the representation of the observed user response to the remote server.

* * * * *